United States Patent [19]

Burggraaf et al.

[11] Patent Number: 5,030,351
[45] Date of Patent: Jul. 9, 1991

[54] PROCESS FOR THE PREPARATION OF A BINARY MEMBRANE TOP LAYER

[75] Inventors: Anthonie J. Burggraaf; Klaas Keizer; Cassilis T. Zaspalis, all of Enschede, Netherlands

[73] Assignee: Massachusetts Institute of Technology, Cambridge, Mass.

[21] Appl. No.: 524,452

[22] Filed: May 16, 1990

[30] Foreign Application Priority Data

Jun. 9, 1989 [NL] Netherlands ............... 8901475

[51] Int. Cl.$^5$ ............................................. B01D 39/00
[52] U.S. Cl. ........................... 210/500.21; 210/500.25; 210/500.26; 210/504; 210/506; 210/509; 210/510.1
[58] Field of Search ............ 210/500.21, 500.25, 210/509, 506, 500.1, 500.26, 490, 510.1, 651, 653, 504

[56] References Cited

U.S. PATENT DOCUMENTS

| | | | |
|---|---|---|---|
| 4,711,719 | 12/1987 | Leenaars et al. | 210/500.26 |
| 4,760,038 | 7/1988 | Kinney, Jr. et al. | 210/510.1 |
| 4,938,870 | 9/1990 | Butler et al. | 210/500.26 |
| 4,957,890 | 9/1990 | Wieserman et al. | 210/500.25 |
| 4,981,590 | 1/1991 | Van'T Veen et al. | 210/500.25 |

FOREIGN PATENT DOCUMENTS

| | | | |
|---|---|---|---|
| 1196873 | 11/1985 | Canada | 210/510.1 |
| 0344011 | 11/1989 | European Pat. Off. | 210/500.21 |

*Primary Examiner*—Robert A. Dawson
*Assistant Examiner*—Ana Fortuna
*Attorney, Agent, or Firm*—Hamilton, Brook, Smith & Reynolds

[57] ABSTRACT

Preparation of binary membrane ultrafiltration (UF) toplayers ($Al_2O_3$-$CeO_2$ and $Alhd\ 2O_3$-$TiO_2$) to make chemically stable UF membranes and/or or catalytically active membranes. Two stable sols are prepared and mixed under controlled conditions and a top layer is prepared on a support under controlled conditions.

11 Claims, 1 Drawing Sheet

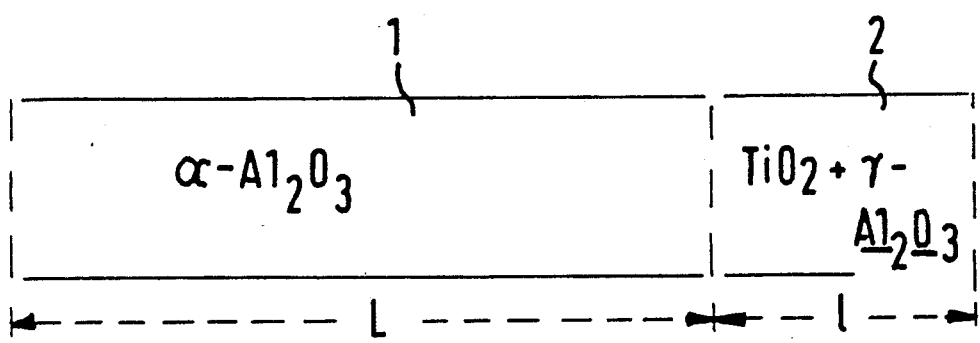

PROCESS FOR THE PREPARATION OF A BINARY MEMBRANE TOP LAYER

The invention relates to a process for the preparation of a binary membrane top layer in a ceramic ultrafiltration membrane system consisting of a mesoporous top layer and a macroporous inorganic carrier. An ultrafiltration membrane is here understood to be a membrane with a top layer having pores smaller than 0.02 $\mu$m, and a carrier having pores larger than 0.1 $\mu$m.

It is known from the Netherlands Patent Application 8303079 to prepare a porous membrane top layer from a single component via the sol/gel technique.

Inorganic membranes are here prepared by lining a dry macroporous inorganic carrier by dipping in a stable sol of colloidal metal oxide or metal hydroxide particles with a certain particle size, the concentration of the dispersed phase in a non-solvent for the metal oxide or metal hydroxide particles being 0.01 to 25% w and the sol in the boundary layer being first converted into a lyogel, removing the carrier from the liquid and drying in air to a xerogel and subsequently calcining and possibly sintering.

It has, however, been found desirable to change the chemical composition of the membrane top layer for catalytical purposes or for gas/solid adsorption/diffusion.

Furthermore, the chemical stability and the possibilities of shaping the top layer have been found to leave room for improvement.

According to the invention, this is achieved by the use of a multicomponent membrane top layer free of defects (especially binary defects) and of cracks.

The process according to the invention is thereto characterized in that a) a stable boehmite sol and a stable sol of either $CeO_2$ or $TiO_2$ is prepared and the sols thus obtained are subsequently mixed to form a binary sol ($Al_2O_3$-$CeO_2$ or $Al_2O_3$-$TiO_2$) under controlled conditions;

b) the top layer is applied to the carrier by dipping in the aforesaid sol under controlled conditions;

c) the top layer thus obtained is dried and subsequently calcined.

It is pointed out that binary membranes are known per se from the article by Cot et al in "Industrial Ceramics" 8(3) (1988) 143-8. This discusses the $RuO_2$-$TiO_2$ system.

The invention also relates to a membrane provided with a binary top layer obtained according to the aforesaid process, as well as to the use of a binary top layer thus obtained.

The invention will now be explained by way of example in more detail with reference to the figure and the examples, the figure schematically showing a cross-section through a binary layer on a carrier.

With reference to the figure, an $\alpha$-$Al_2O_3$ carrier 1 is shown on which a binary top layer 2 $TiO_2$ +gamma-$Al_2O_3$ is applied.

The dimension L is here 2 mm, while the dimension 1 is 1 to 2 $\mu$m. Such a binary membrane is prepared in the following way:

An $\alpha$-alumina carrier is dipped for 2 seconds in a dip solution of a binary sol plus 3% w on a dry solids basis of polyvinyl alcohol (PVA).

Binary sols are made by mixing alumina (1 M) and titania (0.2 M) sols. Alumina sols have a pH of 3 to 6 and titania sols 2 to 3. While mixing the sols, the pH must remain below 5, since otherwise flocculation may take place. The isoelectric point of titania is at pH =5. After dipping, the preparation is dried at 40° C. and 60% relative humidity for 15 hours and then calcined at 450° C. for 3 hours with a heating and cooling rate of 10° C./hour. There is a relationship between the quantity of added PVA and the dipping time required for obtaining a certain layer thickness. Because only a small quantity of PVA (binder) can be added to the dip solution, since PVA reacts with titania resulting in flocculation, the dipping time is in this case short (thin layer). The heating and cooling rate during calcination is low in order to avoid cracking.

According to the invention, two stable sols of alumina (boehmite) and either $CeO_2$ or $TiO_2$ are prepared and mixed to form a binary sol. In the case of $TiO_2$, sulphate ions are added to the sol in order to stabilize the anatase phase of $TiO_2$ at higher temperatures.

The stability of the binary sol must be controlled, since both $CeO_2$ and $TiO_2$ sols are more acidic than alumina (boehmite) sols. The pH of stable boehmite sols, $TiO_2$ sols and $CeO_2$ sols are 3.5, 2 and 1 respectively. $TiO_2$ and boehmite sols can be mixed to 65% w $TiO_2$. Higher concentrations of $TiO_2$ lead to a sharp increase in the viscosity of the binary sol. For the preparation of stable boehmite/$CeO_2$ sol mixtures, nitrate ions must be removed from the $CeO_2$ sol by dialysis until a pH of approximately 3 is obtained.

Membrane top layers can, as has already been pointed out, be obtained from a single component according to the process described in the Netherlands Patent Application 8303079. It is surprising that the structure and the pore diameter of the binary membrane top layers obtained according to the invention closely resemble those of single component $Al_2O_3$ membrane material. The porosity varies between 35 and 50%. Microporous membrane top layers of $CeO_2$ cannot be prepared, since this material coalesces at 450° C. -600° C., accompanied by considerable shrinkage and consequently a high chance of cracking. There is hardly any or no grain growth of the dispersed phase (in contrast with the single component membrane), so that in this way a high degree of dispersion of the minority component can be maintained up to a high temperature, for example 900° C.

Surprisingly, these binary membranes are free of cracks up to a thickness of 10 $\mu$m after their preparation (measured via gas permeation), despite expansion differences between the $Al_2O_3$ and $TiO_2$ components or the $Al_2O_3$ and $CeO_2$ components. After calcination at 450° C. or 600° C., $TiO_2$ and $CeO_2$ are present as particles between the $Al_2O_3$ platelets, i.e. a two-component and two-phase membrane top layer.

The invention will now be further explained with reference to some examples:

EXAMPLE 1

A ceria sol made by peptizing a Ce-hydroxide (oxide) precipitation with acid has a pH of about 1. By means of dialysis, the pH is brought to a value of about 3-4. The sol is then mixed with a boehmite sol (pH 3.5) in a concentration ratio of $Al_2O_3$/$CeO_2$=3.5 (35% w $CeO_2$). By means of the membrane top layer preparation method, described in the Netherlands patent application 8303079, a top layer is applied to a 2 mm thick homogeneous carrier with a pore diameter of 160 nm. The membrane top layer is dried under controlled conditions (40°

C./60% relative humidity) and calcined at 450° C. or 600° C. The membrane is crack-free, as shown by He gas permeation as a function of pressure up to 500 kPa.

EXAMPLE 2

Binary sols are prepared by mixing a boehmite sol (AlOOH 1 molar) and a titanium hydroxide sol (0.2 molar). The first sols have a pH of 3-6 and the second a pH of 2 to 3. While the sols are being mixed, the pH must remain below 5, since otherwise flocculation will occur, as the isoelectric point of titanium hydroxide sols is 5. 3% w binder (PVA) is added to the titanium hydroxide sol in order to make the formation and progress less critical. The $Al_2O_3/TiO_2$ concentration ratio after calcination at 450° C. is 35% w. The top layer is applied in the same manner as in Example 1.

Within the examples the concentration can be varied:

$TiO_2/Al_2O_3=0-75\%$ w $TiO_2$; $CeO_2/Al_2O_3=0-60\%$ w $CeO_2$.

Various types of carriers can be used:
 homogeneous carriers with pores of between 2 nm and 1 μm;
 multilayer (composite) carriers (including commercial) with the same pore sizes in the top layer.

Calcination is possible at between 400° C. and 900° C. without substantial alteration in the structure.

Various modifications of the invention will become apparent to those skilled in the art from the foregoing description, accompanying drawing and examples.

Such modifications are intended to fall within the scope of the appended claims.

What is claimed is:

1. A process for the preparation of a binary membrane top layer in a ceramic ultrafiltration membrane system consisting of a mesoporous top layer and a macroporous inorganic carrier, comprising the steps of:
 (a) preparing a ceria sol by peptizing a Ce-hydroxide (oxide) precipitate with acid to form a stable sol of $CeO_2$;
 (b) mixing the product of step (a) with a stable boehmite ($Al_2O_3$) sol (pH 3.5) in a concentration ratio of $Al_2O_3/CeO_2=3.5$ (35% w $CeO_2$) to form a binary sol consisting essentially of $Al_2O_3$-$CeO_2$ under controlled conditions;
 (c) applying the top layer to said carrier by dipping in the aforesaid sol under controlled conditions; and
 (d) drying the top layer thus obtained and subsequently calcining.

2. A process for the preparation of a binary membrane top layer in a ceramic ultrafiltration membrane system consisting of a mesoporous top layer and a macroporous inorganic carrier, comprising the steps of:
 (a) preparing a stable boehmite ($Al_2O_3$) sol and a stable titanium hydroxide ($TiO_2$) sol and subsequently mixing the sols thus obtained, the pH remaining below 5 during the mixing of the sols, to form a binary sol consisting essentially of $Al_2O_3$-$CeO_2$ under controlled conditions;
 (b) applying the top layer to the carrier by dipping in the aforesaid sol under controlled conditions; and
 (c) drying the top layer thus obtained and subsequently calcining.

3. The process as claimed in claim 1 or 2, wherein the carrier has pores of between 2 nm and 1 μm.

4. The process as claimed in claim 3, wherein the carrier consists of several layers.

5. The process as claimed in claim 3, wherein the carrier is homogeneous.

6. The process as claimed in claim 1, further comprising applying the top layer to a 2 mm thick homogeneous carrier with a pore diameter of 160 nm.

7. The process as claimed in claim 1 or 2, further comprising drying at 40° C. and 60% relative humidity.

8. The process as claimed in claim 1 or 2, further comprising calcining at between 400° C. and 900° C.

9. The process as claimed in claim 2, wherein the $TiO_2/Al_2O_3$ concentration ratio is between 0 and 75% w.

10. The process as claimed in claim 1, wherein the $CeO_2/Al_2O_3$ concentration ratio is between 0 and 60% w.

11. Membrane, provided with a binary top layer, obtained according to the process as in claim 1 or 2.

* * * * *

UNITED STATES PATENT AND TRADEMARK OFFICE
CERTIFICATE OF CORRECTION

PATENT NO. : 5,030,351

DATED : July 9, 1991

INVENTOR(S) : Anthonie J. Burggraaf, Klaas Keizer, Cassilis T. Zaspalis

It is certified that error appears in the above-identified patent and that said Letters Patent is hereby corrected as shown below:

On the title page, after "[73] Assignee" replace "[Massachusetts Institute of Technology, Cambridge, Mass.]" with --Shell Oil Company, Houston, Texas--.

On the title page, after "Attorney, Agent, or Firm" replace [Hamilton, Brook, Smith & Reynolds] with --Ronald R. Reper--.

Signed and Sealed this

Third Day of November, 1992

Attest:

DOUGLAS B. COMER

Attesting Officer

Acting Commissioner of Patents and Trademarks